US010721386B2

(12) United States Patent
    Seki

(10) Patent No.: US 10,721,386 B2
(45) Date of Patent: *Jul. 21, 2020

(54) IMAGE-CAPTURING APPARATUS, ACCESSORY APPARATUS, AND CONTROL METHOD THEREFOR WITH CHANGING SIGNAL LEVEL OF COMMUNICATION CHANNEL FROM ONE LEVEL TO ANOTHER

(71) Applicant: CANON KABUSHIKI KAISHA, Tokyo (JP)

(72) Inventor: Hironori Seki, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,548

(22) Filed: Aug. 6, 2018

(65) Prior Publication Data
    US 2018/0352142 A1    Dec. 6, 2018

Related U.S. Application Data

(62) Division of application No. 15/652,652, filed on Jul. 18, 2017, now Pat. No. 10,070,037.

(30) Foreign Application Priority Data

Jul. 25, 2016 (JP) .................................. 2016-145163

(51) Int. Cl.
    *H04N 5/232*        (2006.01)
    *G03B 17/14*        (2006.01)
    (Continued)

(52) U.S. Cl.
    CPC ......... *H04N 5/23209* (2013.01); *G03B 17/14* (2013.01); *G03B 17/565* (2013.01); *H04N 5/3765* (2013.01); *G03B 2206/00* (2013.01)

(58) Field of Classification Search
    CPC ............. H04N 5/23209; H04N 5/3765; G03B 17/565; G03B 17/14; G03B 2206/00
    See application file for complete search history.

(56) References Cited

U.S. PATENT DOCUMENTS 8,374,499 B2    2/2013  Sakamoto
8,616,790 B2   12/2013  Osawa
                        (Continued)

FOREIGN PATENT DOCUMENTS

CN    103428422 A    12/2013
CN    103581540 A     2/2014
                     (Continued)

OTHER PUBLICATIONS

Dec. 22, 2017 Great Britain Search and Examination Report in Great Britain Patent Appln. No. GB1711696.3.
(Continued)

*Primary Examiner* — Padma Haliyur
(74) *Attorney, Agent, or Firm* — Venable LLP

(57) ABSTRACT

The image-capturing apparatus communicates with an accessory apparatus using a clock/communication request channel and first and second data communication channels. The camera controller switches its communication method between a first communication method in which data communication is performed while a clock signal is alternately switched between first and second levels and a second communication method in which data communication is performed in response to a communication request from the camera controller to the accessory apparatus, which is output by switching a signal level of the clock/communication request channel from the first level to the second level. The camera controller, in response to detecting a communication error in the first and second communication methods, transmits to the accessory apparatus through the second data communication channel a specific signal for restoring the
(Continued)

communication while keeping the signal level of the clock/communication request channel at the first level.

20 Claims, 8 Drawing Sheets

(51) Int. Cl.
*G03B 17/56* (2006.01)
*H04N 5/376* (2011.01)

(56) References Cited

U.S. PATENT DOCUMENTS

| | | | |
|---|---|---|---|
| 8,708,585 B2 * | 4/2014 | Osawa | G03B 17/14 396/529 |
| 8,830,606 B2 | 9/2014 | Imafuji et al. | |
| 8,995,069 B2 * | 3/2015 | Imafuji | G03B 17/14 359/827 |
| 9,143,660 B2 | 9/2015 | Kawada | |
| 9,398,228 B2 | 7/2016 | Morita et al. | |
| 9,426,368 B2 | 8/2016 | Tamura | |
| 9,699,363 B2 | 7/2017 | Imamura et al. | |
| 9,823,548 B2 | 11/2017 | Imafuji et al. | |
| 2009/0180770 A1 | 7/2009 | Honjo et al. | |
| 2011/0170853 A1 | 7/2011 | Osawa | |
| 2011/0299847 A1 | 12/2011 | Sakamoto | |
| 2013/0308042 A1 | 11/2013 | Kawada | |
| 2013/0330068 A1 | 12/2013 | Morita et al. | |
| 2014/0022434 A1 | 1/2014 | Morita et al. | |
| 2016/0227083 A1 | 8/2016 | Imamura et al. | |
| 2016/0320588 A1 | 11/2016 | Kindaichi et al. | |
| 2017/0289430 A1 | 10/2017 | Seki et al. | |

FOREIGN PATENT DOCUMENTS

| | | |
|---|---|---|
| EP | 3229461 A2 | 10/2017 |
| JP | H08-191319 A | 7/1996 |
| JP | 2011-257544 A | 12/2011 |
| JP | 5578951 B2 | 8/2014 |
| KR | 10-1377471 B1 | 3/2014 |

OTHER PUBLICATIONS

Feb. 7, 2020 Korean Official Action in Korean Patent Appln. No. 10-2017-0091863.

Dec. 4, 2019 Chinese Official Action in Chinese Patent Appln. No. 201710613781.5.

* cited by examiner

REQUEST 1: COMMUNICATION METHOD SWITCHING REQUEST
RESPONSE 1: COMMUNICATION METHOD SWITCHING RESPONSE

REQUEST 2: COMMUNICATION ESTABLISHMENT CONFIRMATION REQUEST
RESPONSE 2: COMMUNICATION ESTABLISHMENT CONFIRMATION RESPONSE

IMAGE-CAPTURING APPARATUS, ACCESSORY APPARATUS, AND CONTROL METHOD THEREFOR WITH CHANGING SIGNAL LEVEL OF COMMUNICATION CHANNEL FROM ONE LEVEL TO ANOTHER

BACKGROUND OF THE INVENTION

Field of the Invention

The present invention relates to an image-capturing apparatus (hereinafter referred to as "a camera body") and an accessory apparatus such as an interchangeable lens, which are communicable with each other.

Description of the Related Art

In an accessory-interchangeable camera system including a camera body to which an accessory apparatus is detachably attachable, the camera body and the accessory apparatus (hereinafter referred to as "an interchangeable lens") communicate with each other for controlling the interchangeable lens from the camera body and for providing, from the interchangeable lens to the camera body, data required for controlling the interchangeable lens. An increase in data amount communicated between the camera body and the interchangeable lens requires a new communication method whose communication speed is faster than that of conventional communication methods.

On the other hand, a camera body compatible with the new communication method (this camera body is hereinafter referred to as "a new camera body") is often used with an interchangeable lens compatible only with the conventional communication method (this lens is hereinafter referred to as "a conventional interchangeable lens"), so that the new camera body has to be compatible also with the conventional communication method. Accordingly, it is desirable for the new camera body to first communicate with an attached interchangeable lens in the conventional communication method and then switch, if determining that the attached interchangeable lens is compatible with the new communication method, its communication method to the new communication method.

However, such a new camera body may erroneously determine that, due to communication noise, an attached conventional interchangeable lens compatible only with the conventional communication method is compatible with the new communication method. In this case, the new camera body and the conventional interchangeable lens cannot correctly communicate with each other (that is, a communication error occurs). Therefore, it is necessary to restore the communication therebetween.

Japanese Patent No. 5578951 discloses the following camera system. A camera body first communicates with an attached interchangeable lens using a clock signal channel and two data communication channels in a clock synchronous communication (conventional communication) method. If determining through this communication that the attached interchangeable lens is compatible with a new communication method, the camera body communicates with the attached interchangeable lens in an asynchronous communication (new communication) method that performs data communication using only the two data communication channels. In a case where a communication error occurs in the data communication in the asynchronous communication method, the camera body stops outputting data and changes a signal level of the clock signal channel to thereby notify the interchangeable lens of an initialization of the communication. The interchangeable lens detecting this change in signal level responds to the camera body by also changing the signal level of the clock signal channel. The camera body detecting this change in signal level switches its communication method to the clock synchronous communication method.

However, the camera system disclosed in Japanese Patent No. 5578951 requires that, in the communication in the asynchronous communication method, the clock signal channel does not have other roles than the above-described role of the notification of the communication initialization and the response thereto. For example, in a case of using the clock signal channel for notification of a request to start the data communication between the camera body and the interchangeable lens, it is difficult for the interchangeable lens to distinguish whether the change in signal level of the clock signal channel means the data communication starting request or the communication initialization notification.

SUMMARY OF THE INVENTION

The present invention provides an image-capturing apparatus capable of switching its communication method and of promptly restoring communication between an accessory apparatus when a communication error occurs.

The present invention provides as an aspect thereof an image-capturing apparatus to which an accessory apparatus is detachably attachable. The image-capturing apparatus includes a camera communicator configured to provide, with the accessory apparatus, three channels that are a clock/communication request channel used for providing a clock signal and a communication request from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, and a camera controller configured to perform communication with the accessory apparatus through the camera communicator. The camera controller is configured to be capable of switching its communication method between a first communication method in which the camera controller receives the accessory data from the accessory apparatus and transmits the camera data thereto while providing the clock signal to the accessory apparatus by alternately switching a signal level of the clock/communication request channel between a first level and a second level and a second communication method in which the camera controller provides the communication request to the accessory apparatus by switching the signal level of the clock/communication request channel from the first level to the second level, thereby causing the accessory apparatus to transmit the accessory data to the image-capturing apparatus and transmits the camera data to the accessory apparatus. The camera controller is further configured to, in response to detecting a communication error in the communication in each of the first and second communication methods, transmit to the accessory apparatus through the second data communication channel a specific signal for restoring the communication while keeping the signal level of the clock/communication request channel at the first level.

The present invention provides as another aspect thereof an accessory apparatus detachably attachable to an image-capturing apparatus. The accessory apparatus includes an accessory communicator configured to provide, with the image-capturing apparatus, three channels that are a clock/communication request channel used for providing a clock signal and a communication request from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, and an accessory controller configured to perform communication with the image-capturing apparatus through the accessory communicator. In a case where the image-capturing apparatus is configured to be capable of switching its communication method between a first communication method in which the image-capturing apparatus receives the accessory data from the accessory apparatus and transmits the camera data thereto while providing the clock signal to the accessory apparatus by alternately switching a signal level of the clock/communication request channel between a first level and a second level and a second communication method in which the image-capturing apparatus provides the communication request to the accessory apparatus by switching the signal level of the clock/communication request channel from the first level to the second level, thereby causing the accessory apparatus to transmit the accessory data to the image-capturing apparatus and transmits the camera data to the accessory apparatus, and where the image-capturing apparatus is configured to, in response to detecting a communication error in the communication in each of the first and second communication methods, transmit to the accessory apparatus through the second data communication channel a specific signal for restoring the communication while keeping the signal level of the clock/communication request channel at the first level, the accessory controller is configured to, in response to the signal level of the clock/communication request channel being kept at the first level, receive the specific signal as a signal for restoring the communication.

The present invention provides as yet another aspect thereof an image-capturing system including the above image-capturing apparatus and accessory apparatus.

The present invention provides as still another aspect thereof a control method of controlling an image-capturing apparatus to which an accessory apparatus is detachably attachable. The image-capturing apparatus provides, with the accessory apparatus, three channels that are a clock/communication request channel used for providing a clock signal and a communication request from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus. The control method includes the step of causing the image-capturing apparatus to switch its communication method between a first communication method in which the image-capturing apparatus receives the accessory data from the accessory apparatus and transmits the camera data thereto while providing the clock signal to the accessory apparatus by alternately switching a signal level of the clock/communication request channel between a first level and a second level and a second communication method in which the image-capturing apparatus provides the communication request to the accessory apparatus by switching the signal level of the clock/communication request channel from the first level to the second level, thereby causing the accessory apparatus to transmit the accessory data to the image-capturing apparatus and transmits the camera data to the accessory apparatus, and the step of causing the image-capturing apparatus to, in response to detecting a communication error in the communication in each of the first and second communication methods, transmit to the accessory apparatus through the second data communication channel a specific signal for restoring the communication while keeping the signal level of the clock/communication request channel at the first level.

The present invention provides as yet still another aspect thereof a control method of controlling an accessory apparatus detachably attachable to an image-capturing apparatus. The accessory apparatus provides, with the image-capturing apparatus, three channels that are a clock/communication request channel used for providing a clock signal and a communication request from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus. The control method includes the step of causing the accessory apparatus to, in a case where the image-capturing apparatus is configured to be capable of switching its communication method between a first communication method in which the image-capturing apparatus receives the accessory data from the accessory apparatus and transmits the camera data thereto while providing the clock signal to the accessory apparatus by alternately switching a signal level of the clock/communication request channel between a first level and a second level and a second communication method in which the image-capturing apparatus provides the communication request to the accessory apparatus by switching the signal level of the clock/communication request channel from the first level to the second level, thereby causing the accessory apparatus to transmit the accessory data to the image-capturing apparatus and transmits the camera data to the accessory apparatus, and where the image-capturing apparatus is configured to, in response to detecting a communication error in the communication in each of the first and second communication methods, transmit to the accessory apparatus through the second data communication channel a specific signal for restoring the communication while keeping the signal level of the clock/communication request channel at the first level, in response to the signal level of the clock/communication request channel being kept at the first level, receive the specific signal as a signal for restoring the communication.

The present invention provides as further another aspect thereof a non-transitory storage medium storing a computer program for causing a computer to execute the above control method in the above image-capturing apparatus and accessory apparatus.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 1:
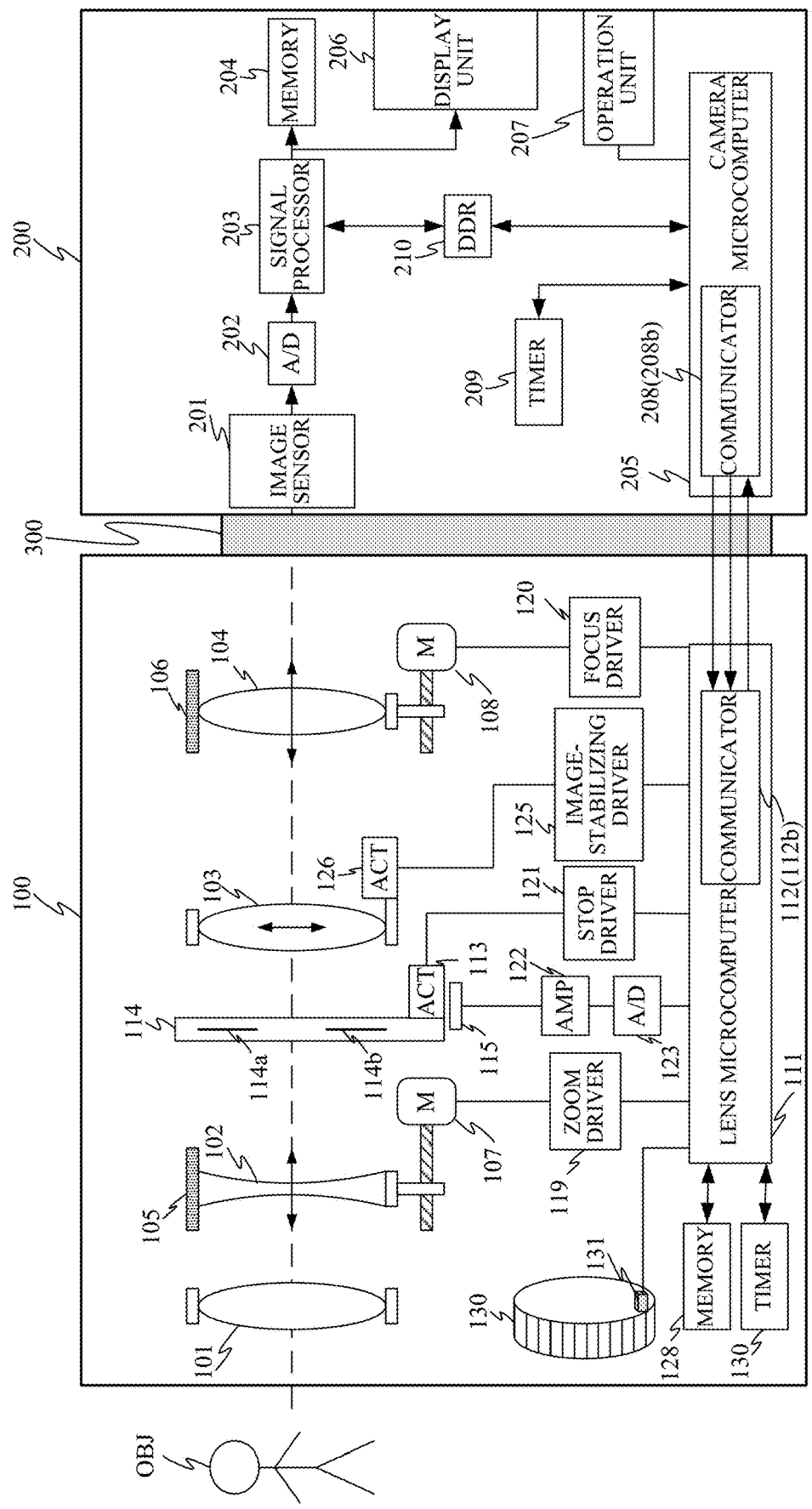
FIG. 1 is a block diagram illustrating a configuration of a camera body and an interchangeable lens in Embodiment of the present invention.

FIG. 1 illustrates a configuration of an image-capturing system (hereinafter referred to as "a camera system") including a camera body 200 as an image-capturing apparatus and an interchangeable lens 100 as an accessory apparatus that are a first embodiment (Embodiment 1) of the present invention.

The camera body 200 and the interchangeable lens 100 transmit control commands and internal information to each other via their communicators described later. The communicators are compatible with various communication methods and switch their communication formats to the same one in synchronization with each other depending on types of data to be communicated and purposes of their communication, which enables selecting an optimum communication format for each of various situations.

First, description will be made of specific configurations of the interchangeable lens 100 and the camera body 200. The interchangeable lens 100 and the camera body 200 are mechanically and electrically connected with each other via a mount 300 including a coupling mechanism. The interchangeable lens 100 receives power supply from the camera body 200 via a power source terminal (not illustrated) provided in the mount 300 and supplies, to various actuators and a lens microcomputer 111 described later, power sources necessary for their operations. The interchangeable lens 100 and the camera body 200 communicate with each other via communication terminals (illustrated in FIG. 2) provided in the mount 300.

The interchangeable lens 100 includes the lens microcomputer 111, an image-capturing optical system, a memory 128, and a timer 130. The image-capturing optical system includes, from an object (OBJ) side, a field lens 101, a magnification-varying lens 102 for variation of magnification, an aperture stop unit 114 for light amount control, an image-stabilizing lens 103 for image blur correction and a focus lens 104 for focusing.

The magnification-varying lens 102 and the focus lens 104 are respectively held by lens holders 105 and 106. The lens holders 105 and 106 are guided by guide bars (not illustrated) movably in an optical axis direction in which an optical axis (illustrated by a broken line) of the image-capturing optical system extends and are driven in the optical axis direction respectively by stepping motors 107 and 108. The stepping motors 107 and 108 rotate in synchronization with drive pulses and respectively move the magnification-varying lens 102 and the focus lens 104.

The image-stabilizing lens 103 is moved in a direction orthogonal to the optical axis of the image-capturing optical system to reduce image blur caused by user's hand jiggling or the like.

The timer 130 is a free-run timer that counts time with microsecond accuracy. The memory 128 stores times (such as a Low level detection time described later) counted by the timer 130.

The lens microcomputer 111 as an accessory controller controls various operations in the interchangeable lens 100. The lens microcomputer 111 receives, via the lens communicator 112 as an accessory communicator, control commands transmitted from the camera body 200 and transmission requests (communication requests) for lens data (accessory data) output therefrom. The lens microcomputer 111 performs various lens controls corresponding to the control commands and transmits lens data corresponding to the transmission requests to the camera body 200 via the lens communicator 112. The lens microcomputer 111 performs operations relating to the communication with the camera body 200 (that is, with a camera microcomputer 205 described later) according to a lens communication control program as a computer program.

This embodiment employs, as communication methods for communication between the lens microcomputer 111 and the camera microcomputer 205, a clock synchronous communication method and an asynchronous serial communication method.

The lens microcomputer 111 outputs, in response to a zoom command and a focus drive command among the control commands, a zoom drive signal and a focus drive signal to a zoom driver 119 and a focus driver 120 to cause them to drive the stepping motors 107 and 108, thereby performing a zoom process to control a magnification variation operation by the magnification-varying lens 102 and an AF (autofocus) process to control a focus operation by the focus lens 104.

The interchangeable lens 100 is provided with a manual focus ring 130 that is rotationally operable by a user and a focus encoder 131 for detecting a rotational operation amount of the manual focus ring 130. The lens microcomputer 111 causes the focus driver 120 to drive the stepping motor 108 by a drive amount corresponding to the rotational operation amount of the manual focus ring 130 detected by the focus encoder 131 to drive the focus lens 104, thereby performing MF (manual focus).

The aperture stop unit 114 includes stop blades 114a and 114b. An open-and-close state of the stop blades 114a and 114b is detected by a hall element 115, and a detection result thereof is input to the lens microcomputer 111 through an amplifier 122 and an A/D converter 123.

The lens microcomputer 111 outputs, depending on the input detection result from the A/D converter 123, a stop drive signal to a stop driver 121 so as to cause the stop driver 121 to drive a stop actuator 113, thereby controlling a light amount control operation of the aperture stop unit 114.

The interchangeable lens 100 further includes a shake sensor (not illustrated and hereinafter referred to as "a gyro sensor") constituted by a vibration gyro or the like. The lens microcomputer 111 drives an image-stabilizing actuator 126 constituted by a voice coil motor or the like through an image-stabilizing driver 125 depending on a shake (angular velocity) detected by the gyro sensor, thereby performing an image-stabilizing process to control the movement of the image-stabilizing lens 103. Prior to the driving of the image-stabilizing actuator 126, a lock mechanism that holds the image-stabilizing lens 103 at its initial position is released.

The camera body 200 includes an image sensor 201 constituted by a CCD sensor, a CMOS sensor or the like, an A/D converter 202, a signal processor 203, a recorder (memory) 204, the camera microcomputer 205, a display unit 206, and a timer 209.

The image sensor 201 photoelectrically converts an object image formed by the image-capturing optical system in the interchangeable lens 100 to output an image-capturing signal as an analog electrical signal.

The A/D converter 202 converts the analog image-capturing signal from the image sensor 201 into a digital image-capturing signal. The signal processor 203 performs various image processes on the digital image-capturing signal from the A/D converter 202 to produce a video signal. The signal processor 203 produces, from the video signal, focus information indicating a contrast state of the object image (that is, a focus state of the image-capturing optical system) and luminance information indicating an exposure state. The signal processor 203 outputs the video signal to the display unit 206. The display unit 206 displays the video signal as a live-view image used for checking an image-capturing composition and the focus state. In addition, the signal processor 203 outputs the video signal to the recorder 204. The recorder 204 records the video signal.

A memory 210 is constituted by, for example, a DDR (Double Data Rate SDRAM). The memory 210 stores the digital image-capturing signal obtained using the image sensor 201 and the video signal produced by the image processor 203 and stores the lens data received from the lens microcomputer 111. The timer 209 is a free-run timer that counts time with microsecond accuracy.

The camera microcomputer 205 as a camera controller controls the camera body 200 in response to inputs from a camera operation unit 207 including an image-capturing instructing switch and various setting switches (not illustrated). The camera microcomputer 205 transmits, in response to a user's operation of a zoom switch (not illustrated), the control command relating to the magnification-varying operation of the magnification-varying lens 102 to the lens microcomputer 111 through a camera data transceiver 208b.

Moreover, the camera microcomputer 205 transmits, to the lens microcomputer 111 through the camera data transceiver 208b, the control command relating to the light amount control operation of the aperture stop unit 114 depending on the luminance information and the control command relating to the focusing operation of the focus lens 104 depending on the focus information. The camera microcomputer 205 performs operations relating to the communication with the lens microcomputer 111 according to a camera communication control program as a computer program.

Figure 2:
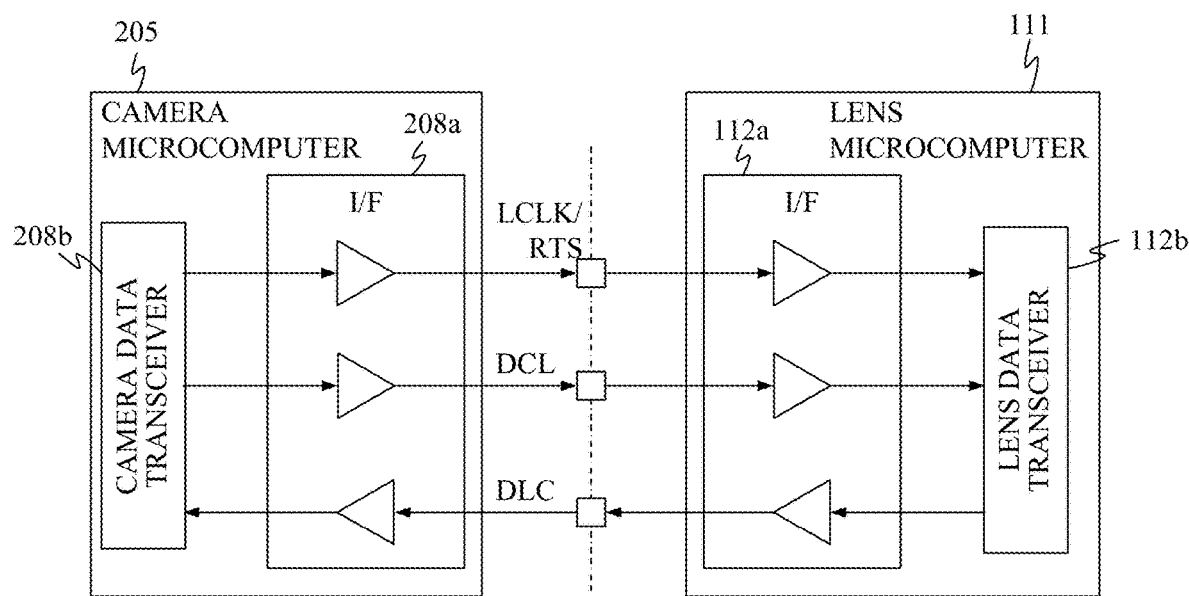
FIG. 2 is a block diagram illustrating a configuration of a communication circuit in Embodiment.

Next, with referring to FIG. 2, description will be made of a communication circuit constituted between the camera body 200 (camera microcomputer 205) and the interchangeable lens 100 (lens microcomputer 111) and of the communication performed therebetween. The camera microcomputer 205 has a function of managing settings for the communication with the lens microcomputer 111 and a function of providing notices such as the transmission requests. On the other hand, the lens microcomputer 111 has a function of producing lens data and a function of transmitting the lens data. The camera microcomputer 205 further has a function of detecting a communication error described later.

The camera microcomputer 205 includes a camera communication interface circuit 208a, and the lens microcomputer 111 includes a lens communication interface circuit 112a. The camera microcomputer 205 (camera data transceiver 208b) and the lens microcomputer 111 (lens data transceiver 112b) communicate with each other through the communication terminals (illustrated by three boxes) provided in the mount 300 and the camera and lens communication interface circuits 208a and 112a. In this embodiment, the camera and lens microcomputers 205 and 111 selectively perform serial communication in a three-wire clock synchronous communication method (as a first communication method) using three channels and serial communication in a three-wire asynchronous communication method (as a second communication method) using three channels. The camera data transceiver 208b and the camera communication interface circuit 208a constitute the camera communicator 208. The lens data transceiver 112b and the lens communication interface circuit 112a constitute the lens communicator 112.

The three channels are a clock/transmission request channel (clock/communication request channel) used as a clock channel in the clock synchronous communication method and as a transmission request channel in the asynchronous communication method, a first data communication channel, and a second data communication channel. That is, the clock synchronous communication method and the asynchronous communication method use common three channels.

The clock/transmission request channel is used in the clock synchronous communication method for providing clock signals from the camera microcomputer 205 to the lens microcomputer 111. The provision of the clock signal is performed by alternately switching a signal level (voltage level) on the clock/transmission request channel between High as a first level and Low as a second level.

The clock/transmission request channel is used in the asynchronous communication method for providing the notices such as the transmission requests (transmission request signals) for the lens data from the camera microcomputer 205 to the lens microcomputer 111. The provision of the transmission request is performed by switching the signal level on the clock/transmission request channel from High to Low. The clock/transmission request channel is also used in the asynchronous communication method for providing other notices (requests) than the transmission requests.

In the following description, the clock signal provided through the clock/transmission request channel is referred to as "a clock signal LCLK", and the transmission request signal provided through the clock/transmission request channel is referred to as "a request-to-send signal RTS".

The first data communication channel is used for transmitting the lens data from the lens microcomputer 111 to the camera microcomputer 205. The lens data transmitted as a signal from the lens microcomputer 111 to the camera microcomputer 205 through the first data communication channel is hereinafter referred to as "a lens data signal DLC". The second data communication channel is used for transmitting camera data from the camera microcomputer 205 to the lens microcomputer 111. The camera data transmitted as a signal from the camera microcomputer 205 to the lens microcomputer 111 through the second data communication channel is hereinafter referred to as "a camera data signal DCL".

The request-to-send signal RTS is provided from the camera microcomputer 205 as a communication master to the lens microcomputer 111 as a communication slave. The camera data signal DCL includes various control commands and transmission request commands transmitted from the camera microcomputer 205 to the lens microcomputer 111.

The lens data signal DLC includes various lens data transmitted from the lens microcomputer 111 to the camera microcomputer 205. The camera and lens microcomputers 205 and 111 set their communication speed beforehand and perform the communication (transmission and receipt) at a communication bit rate according to this setting. The communication bit rate indicates a data amount transferable per second and is expressed with a unit of bps (bits per second).

Figure 3:
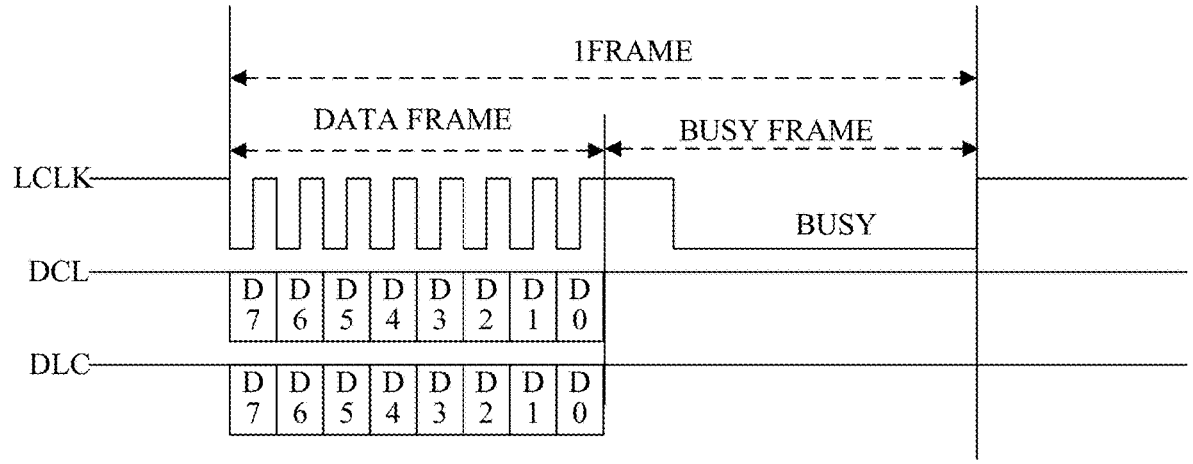
FIG. 3 illustrates waveforms of signals communicated between the camera body and the interchangeable lens in a clock synchronous communication method in Embodiment.

FIG. 3 illustrates waveforms of signals in one frame as a minimum communication unit; the signals are communicated between the camera microcomputer 205 and the lens microcomputer 111 in the clock synchronous communication method. The camera microcomputer 205 outputs the clock signal LCLK as a group of eight pulses to the clock/transmission request channel to thereby provide the clock signal LCLK to the lens microcomputer 111, and transmits in synchronization with the clock signal LCLK the camera data signal DCL to the lens microcomputer 111. Simultaneously therewith, the camera microcomputer 205 receives the lens data signal DLC output from the lens microcomputer 111 in synchronization with the clock signal LCLK.

The camera microcomputer 205 and the lens microcomputer 111 thus transmit and receive therebetween one-byte (eight-bit) data in synchronization with the clock signal LCLK by full-duplex communication. A time period of the one-byte data transmission and receipt is called a data frame.

After this data frame, the lens microcomputer 111 provides a communication standby request BUSY to the camera microcomputer 205 by setting a signal level of the lens data signal DLC to Low. A time period in which this communication standby request BUSY is provided is referred to as "a BUSY frame".

A communication unit including the data frame and the BUSY frame is referred to as "one frame".

Depending on a communication status, there is a case where the BUSY frame is not provided. In this case, the one frame includes only the data frame.

The camera microcomputer 205 confirms that the signal level of the lens data signal DLC returns to High, in other words, that the communication standby request BUSY is terminated, and then starts transmission of a next frame.

Figure 4:
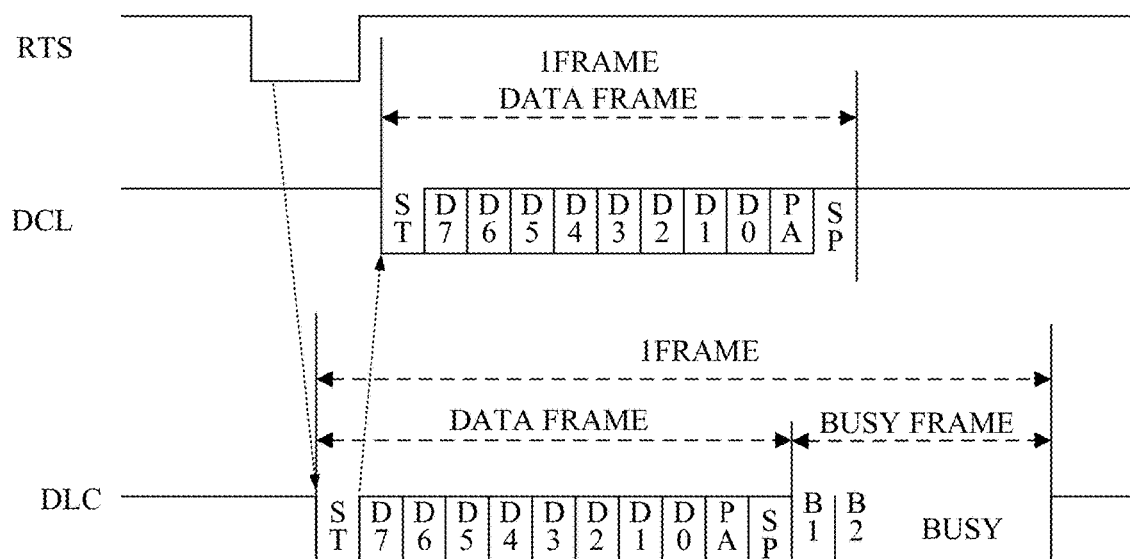
FIG. 4 illustrates waveforms of signals communicated between the camera body and the interchangeable lens in an asynchronous communication method in Embodiment.

FIG. 4 illustrates waveforms of signals in one frame as a minimum communication unit; the signals are communicated between the camera microcomputer 205 and the lens microcomputer 111 in the asynchronous communication method. The camera data signal DCL and the lens data signal DLC have mutually different parts in their data formats in the one frame.

First, description will be made of the data format of the lens data signal DLC. The lens data signal DLC in the one frame includes, as large parts, a data frame as a first frame and a BUSY frame as a subsequent frame. A signal level of the lens data signal DLC is held at High in a non-transmission state where data transmission is not performed.

The lens microcomputer 111 sets the signal level to Low in one bit time period in order to provide a notice of a start of one frame transmission of the lens data signal DLC to the camera microcomputer 205.

The one bit time period indicating a start of one frame is called "a start bit ST" in this embodiment. That is, one data frame is started from this start bit ST. The start bit ST is provided as a head bit of each one frame of the lens data signal DLC.

Next, the lens microcomputer 111 transmits one-byte lens data in 8 bit time period from a subsequent second bit to a ninth bit. The data bits are arranged in an MSB-first format starting from a highest-order data bit D7 and continuing to data bits D6, D5, D4, D3, D2 and D1 in this order and ending with a lowest-order data bit D0.

Then, the lens microcomputer 111 adds one bit parity information (parity bit) PA at a tenth bit and sets the signal level of the lens data signal DLC to High in a time period of a stop bit SP indicating an end of the one frame. Thus, the data frame starting from the start bit SP ends.

The parity information PA is set such that a total sum (hereinafter referred to as "a check sum") of the data bits included in one frame becomes even or odd number. Whether the check sum is set to even number or odd number may be statically (beforehand) decided, or may be dynamically provided from the camera microcomputer 205 to the lens microcomputer 111 by their data communication.

If parities (even or odd) of the check sums do not coincide with each other, the camera microcomputer 205 detects a parity error. Furthermore, if the signal level of the lens data signal DLC is at Low during the time period of the stop bit SP, the camera microcomputer 205 detects a framing error.

Thereafter, the lens microcomputer 111 adds the BUSY frame described above after the stop bit SP. The BUSY frame indicates the time period of the communication standby request BUSY as a notice (hereinafter referred to as "a BUSY notice") from the lens microcomputer 111 to the camera microcomputer 205. The lens microcomputer 111 holds the signal level of the lens data signal DLC at Low until terminating the BUSY notice.

On the other hand, for a case where the BUSY notice is unnecessary to be provided from the lens microcomputer 111 to the camera microcomputer 205, a data format is provided that forms one frame without adding the BUSY notice. That is, the lens microcomputer 111 can select as the data format of the lens data signal DLC, depending on a process situation, one to which the BUSY notice is added and one to which the BUSY notice is not added.

Description will be made of a method of determining the presence and absence of the BUSY notice; the method is performed by the camera microcomputer 205. In FIG. 4, the signal waveform of the lens data signal DLC includes bit positions B1 and B2. The camera microcomputer 205 selects one of these bit positions B1 and B2 as a BUSY determination position P for determining the presence and absence of the BUSY notice. As just described, this embodiment employs a data format that selects the BUSY determination position P from the bit positions B1 and B2. This data format enables addressing a problem that a process time from the transmission of the data frame of the lens data signal DLC until the determination of the presence of the BUSY notice (the lens data signal DLC is set to Low) is changed depending on a processing performance of the lens microcomputer 111.

Whether to select the bit position B1 or B2 as the BUSY determination position P is set by the communication between the camera and lens microcomputers 205 and 111 before the data communication therebetween is performed. The BUSY determination position P is not necessary to be fixed at the bit position B1 or B2 and may be changed depending on processing capabilities of the camera and lens microcomputers 205 and 111.

Next, description will be made of a data format of the camera data signal DCL. Specifications of the data format of the camera data signal DCL in one frame are common to those of the lens data signal DLC. However, the addition of the BUSY frame to the camera data signal DCL is prohibited, which is different from the lens data signal DLC.

Next, communication procedures between the camera and lens microcomputers 205 and 111 in the asynchronous communication method will be described.

The camera microcomputer 205 sets, when an event for starting the communication with the lens microcomputer 111 is generated, a signal level of the request-to-send signal RTS to Low (in other words, asserts the request-to-send signal RTS) to provide the transmission request to the lens microcomputer 111.

The lens microcomputer 111 having detected the transmission request through the assertion (Low) of the request-to-send signal RTS performs a process to produce the lens data signal DLC to be transmitted to the camera microcomputer 205. Then, after a preparation for transmitting the lens data signal DLC is completed, the lens microcomputer 111 starts transmitting one byte (frame) of the lens data signal DLC through the first data communication channel.

The lens microcomputer 111 starts the transmission of the lens data signal DLC within a time period mutually set by the camera and lens microcomputers 205 and 111 after the assertion of the request-to-send signal RTS. That is, for the lens microcomputer 111, a strict restriction is not provided that it is necessary to set the lens data to be transmitted before a first clock pulse is input thereto in a time period from the assertion of the request-to-send signal RTS to a start of the transmission of the lens data signal DLC.

Next, in response to detecting the start bit ST as a head bit of the data frame of the lens data signal DLC received from the lens microcomputer 111 (that is, in response to a start of receiving the lens data signal DLC), the camera microcomputer 205 returns the signal level of the request-to-send signal RTS to High, in other words, negates the request-to-send signal RTS. The camera microcomputer 205 thereby terminates the transmission request after the start of the transmission of the lens data signal DLC, and starts transmission of the camera data signal DCL through the second data communication channel. The negation of the request-to-send signal RTS may be performed any one of before and after the start of the transmission of the camera data signal DCL. It is only necessary that these negation and transmission be performed until the receipt of the data frame of the lens data signal DLC is completed.

The lens microcomputer 111 having transmitted the data frame of the lens data signal DLC adds the BUSY frame to the lens data signal DLC in a case where the BUSY notice is required to be provided to the camera microcomputer 205. In a case where the BUSY notice is not is required to be provided to the camera microcomputer 205, the lens microcomputer 111 does not add the BUSY frame to the lens data signal DLC. The camera microcomputer 205 monitors the presence and absence of the BUSY notice and prohibits the assertion of the request-to-send signal RTS for a subsequent transmission request while the BUSY notice is provided.

The lens microcomputer 111 executes necessary processes in a time period where the communication from the camera microcomputer 205 is prohibited by the BUSY notice and terminates the BUSY notice after a subsequent communication preparation is completed. The assertion of the request-to-send signal RTS by the camera microcomputer 205 for the subsequent transmission request is permitted under a condition that the BUSY notice is terminated and the transmission of the data frame of the camera data signal DCL is completed. As just described, in this embodiment, in response to the assertion of the request-to-send signal RTS upon the generation of the communication starting event in the camera microcomputer 205, the lens microcomputer 111 starts transmitting the data frame of the lens data signal DLC to the camera microcomputer 205. On the other hand, the camera microcomputer 205 starts, in response to detecting the start bit ST of the lens data signal DLC, transmitting the data frame of the camera data signal DCL to the lens microcomputer 111. The lens microcomputer 111 adds, as needed, the BUSY frame to the data frame of the lens data signal DLC for providing the BUSY notice and then terminates the BUSY notice to end one frame communication process. In this communication process, the camera microcomputer 205 and the lens microcomputer 111 mutually transmit and receive one byte data.

Figure 5:
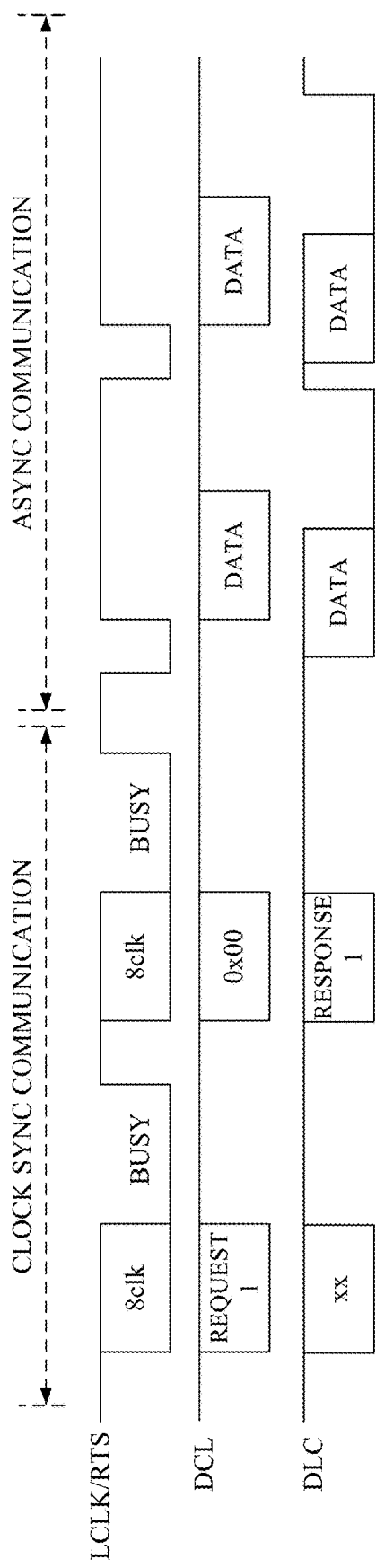
FIG. 5 illustrates waveforms of signals communicated between the camera body and the interchangeable lens when the communication method is switched in Embodiment.

FIG. 5 illustrates signal waveforms when the camera and lens microcomputers 205 and 111 switch their communication methods from the clock synchronous communication method to the asynchronous communication method. The camera microcomputer 205, in response to detecting the attachment (connection) of the interchangeable lens 100, performs communication therewith in the clock synchronous communication method.

The camera microcomputer 205 determines through this communication with the lens microcomputer 111 whether or not the interchangeable lens 100 is compatible with the asynchronous communication method. If the interchangeable lens 100 is compatible with the asynchronous communication method, the camera microcomputer 205 acquires from the lens microcomputer 111 a communication speed (a number of bits transmittable per second) that can be used in the asynchronous communication method. The camera microcomputer 205 further transmits, to the lens microcomputer 111 by the camera data signal DCL, a request to switch the communication method (hereinafter referred to as "a communication method switching request") to the asynchronous communication method.

In response to receiving this communication method switching request, the lens microcomputer 111 transmits a communication method switching response to the camera microcomputer 205 by the lens data signal DLC of a next frame. Simultaneously therewith, the lens microcomputer 111 prepares to switch the communication method. Specifically, the lens microcomputer 111 switches a communication mode of the lens communication interface circuit 112a from a clock synchronous communication mode to an asynchronous communication mode. In this switching, the lens microcomputer 111 keeps the BUSY notice, and then terminates the BUSY notice after the switching of the communication method is completed. In response to receiving the communication method switching response from the lens microcomputer 111 and to the termination of the BUSY notice, the camera microcomputer 205 switches a communication mode of the camera communication interface circuit 208a to an asynchronous communication mode.

Thereafter, the camera microcomputer 205 transmits in the asynchronous communication method, to the lens microcomputer 111 via the camera communication interface circuit 208a in the asynchronous communication mode, a request to confirm an establishment of communication in the asynchronous communication method. This request is hereinafter referred to as "a communication establishment confirmation request". In response to receiving the communication establishment confirmation request via the lens communication interface circuit 112a in the asynchronous communication mode without an error, the lens microcomputer 111 transmits a communication establishment confirmation response to the camera microcomputer 205. In response to receiving the communication establishment confirmation response, the camera microcomputer 205 starts control communication and data communication with the lens microcomputer 111 in the asynchronous communication method.

Figure 6:
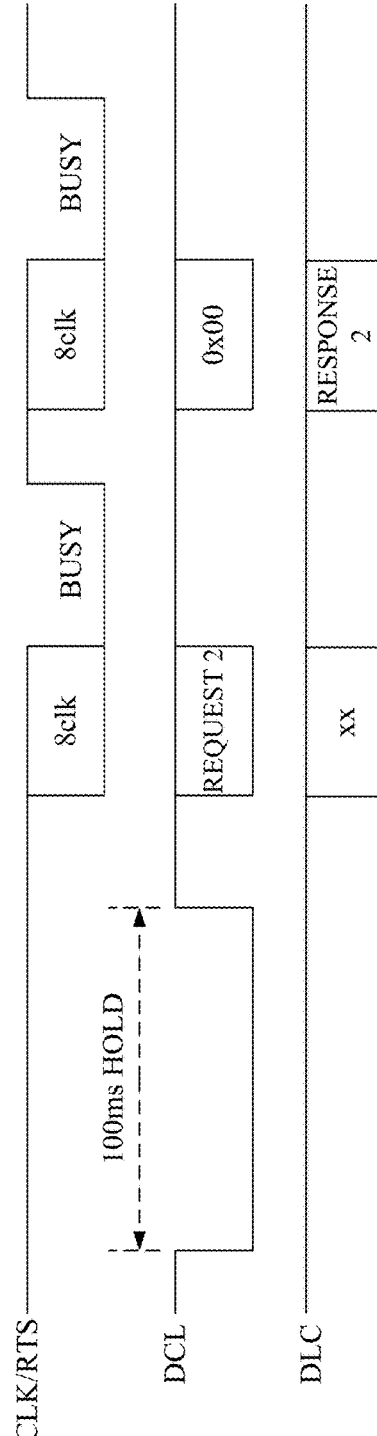
FIG. 6 illustrates waveforms of signals communicated between the camera body and the interchangeable lens when communication therebetween is restored in Embodiment.

FIG. 6 illustrates signal waveforms in restoring the communication between the camera and lens microcomputers 205 and 111 when a communication error occurs. For example, while the camera microcomputer 205 is transmitting the communication method switching request to the lens microcomputer 111, communication noise such as static electric noise generated in the mount 300 may change the communication method switching request to another command. In this case, the lens microcomputer 111 recognizes this changed command as a command other than the communication method switching request. Furthermore, the communication noise generated in the mount 300 may change a command in the control communication or a data signal in the data communication, which are quite different from the communication method switching request, to the communication method switching request. In this case, the lens microcomputer 111 recognizes this changed command or data as the communication method switching request.

Such erroneous recognitions cause a difference in communication method between the camera and lens microcomputers 205 and 111, that is, cause a communication error state in which the control communication and the data communication are entirely impossible. When successively detecting such a communication error state a predetermined number of times (for example, three times), the camera microcomputer 205 determines that the communication has become impossible, that is, the difference in communication method between the camera and lens microcomputers 205 and 111 has occurred. The camera microcomputer 205 determining that the communication has become impossible (the difference in communication method has occurred) switches, while keeping the signal level of the clock/transmission request channel at High, a signal level of the camera data signal DCL to Low (predetermined level) and keeps this Low signal level for a predetermined time, for example, 100 ms. The Low signal as the camera data signal DCL kept for the predetermined time corresponds to a communication restoration request as a specific signal for restoring (or requesting to restore) the communication.

In response to detecting that the signal level of the camera data signal DCL has been kept at Low for the predetermined time without the signal level of the clock/transmission request channel being switched from High, the lens microcomputer 111 recognizes that this Low camera data signal DCL is the communication restoration request and thus restores the communication in the clock synchronous communication method. When the original communication method has been the clock synchronous communication method, the lens microcomputer 111 discards data having been not yet transmitted, in order to initialize (reset) the communication. On the other hand, the camera microcomputer 205 returns the signal level of the camera data signal DCL to High.

Thereafter, the camera microcomputer 205 transmits a communication establishment confirmation request to the lens microcomputer 111 in the clock synchronous communication method. The lens microcomputer 111 having received the communication establishment confirmation request transmits a communication establishment confirmation response to the camera microcomputer 205. The camera microcomputer 205 having received the communication establishment confirmation response starts control communication and data communication with the lens microcomputer 111 in the clock synchronous communication method.

Figure 7:
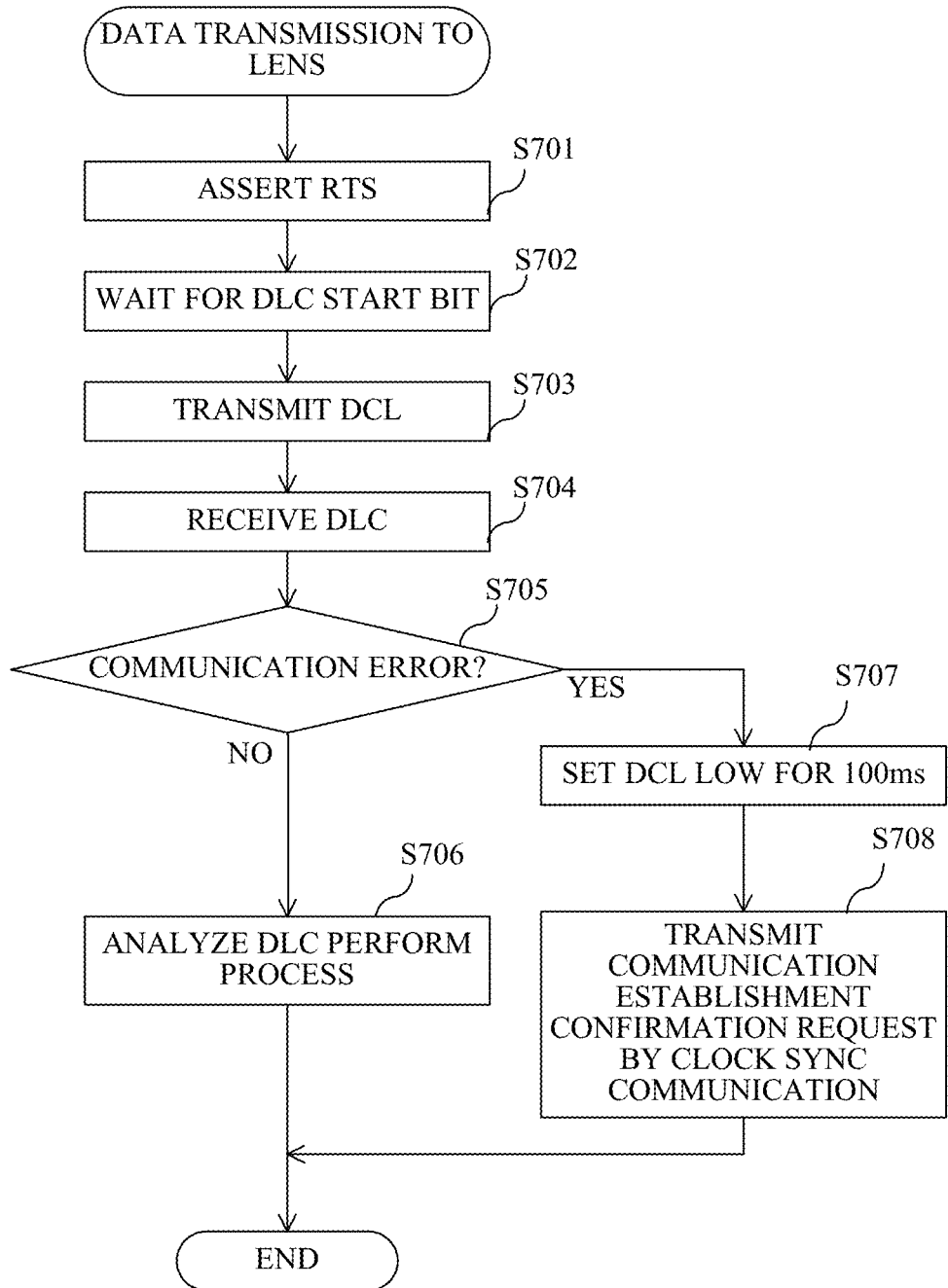
FIG. 7 is a flowchart of a process performed by the camera body in Embodiment 1.

Next, description will be made of camera and lens communication restoration processes performed by the camera and lens microcomputers 205 and 111 when the camera microcomputer 205 intends to communicate with the lens microcomputer 111 in the asynchronous communication method and, on the other hand, the lens microcomputer 111 intends to communicate with the camera microcomputer 205 in the clock synchronous communication method. FIG. 7 is a flowchart of a camera communication control process (control method) including the camera communication restoration process and performed by the camera microcomputer 205 intending to communicate with the lens microcomputer 111 in the asynchronous communication method. The camera microcomputer 205 executes this process according to the camera communication control program.

At step S701, in response to the communication starting event for starting the communication with the lens microcomputer 111, the camera microcomputer 205 asserts the request-to-send signal RTS to provide the transmission request (communication starting request) to the lens microcomputer 111.

Next at step S702, the camera microcomputer 205 waits for receiving the start bit ST of the lens data signal DLC transmitted from the lens microcomputer 111. In response to receiving the start bit ST, the camera microcomputer 205 proceeds to step S703.

At step S703, the camera microcomputer 205 transmits the camera data signal DCL to the lens microcomputer 111.

Next at step S704, the camera microcomputer 205 receives the lens data signal DLC (subsequent to the start bit ST) transmitted from the lens microcomputer 111.

Next at step S705, the camera microcomputer 205 determines whether or not the communication error has occurred between the camera and lens microcomputers 205 and 111. When the lens microcomputer 111 transmits the lens data signal DLC in the clock synchronous communication method, the camera microcomputer 205 receives a signal waveform different from that in the asynchronous communication method. As a result, the camera microcomputer 205 detects the parity error or the framing error to determine that the communication error has occurred. If the communication error has occurred, the camera microcomputer 205 proceeds to step S707, and otherwise proceeds to step S706.

At step S706, the camera microcomputer 205 analyzes the camera data signal DCL received at step S704 to store a result of the analysis to the memory 210, and perform a process corresponding to that analysis result. Then, the camera microcomputer 205 ends this process.

On the other hand, at step S707, the camera microcomputer 205 switches, while keeping the signal level of the request-to-send signal RTS at High, the signal level of the camera data signal DCL to Low and keeps this Low signal level for the predetermined time (100 ms). That is, the camera microcomputer 205 transmits the communication restoration request to the lens microcomputer 111.

When the signal level of the clock signal LCLK or the request-to-send signal RTS does not change for the predetermined time, the camera microcomputer 205 at step S708 transmits the communication establishment confirmation request to the lens microcomputer 111 in the clock synchronous communication method. In response to receiving the communication establishment confirmation request, the lens microcomputer 111 returns the communication establishment confirmation response to the camera microcomputer 205.

Thereafter, the camera microcomputer 205 determines whether or not the interchangeable lens 100 is compatible with the asynchronous communication method. If the interchangeable lens 100 is compatible with the asynchronous communication method, the camera microcomputer 205 transmits to the lens microcomputer 111 the communication method switching request to the asynchronous communication method. In response to receiving the communication method switching response from the lens microcomputer 111, the camera microcomputer 205 switches its communication method to the asynchronous communication method. Then, the camera microcomputer 205 ends this process.

Figure 8:
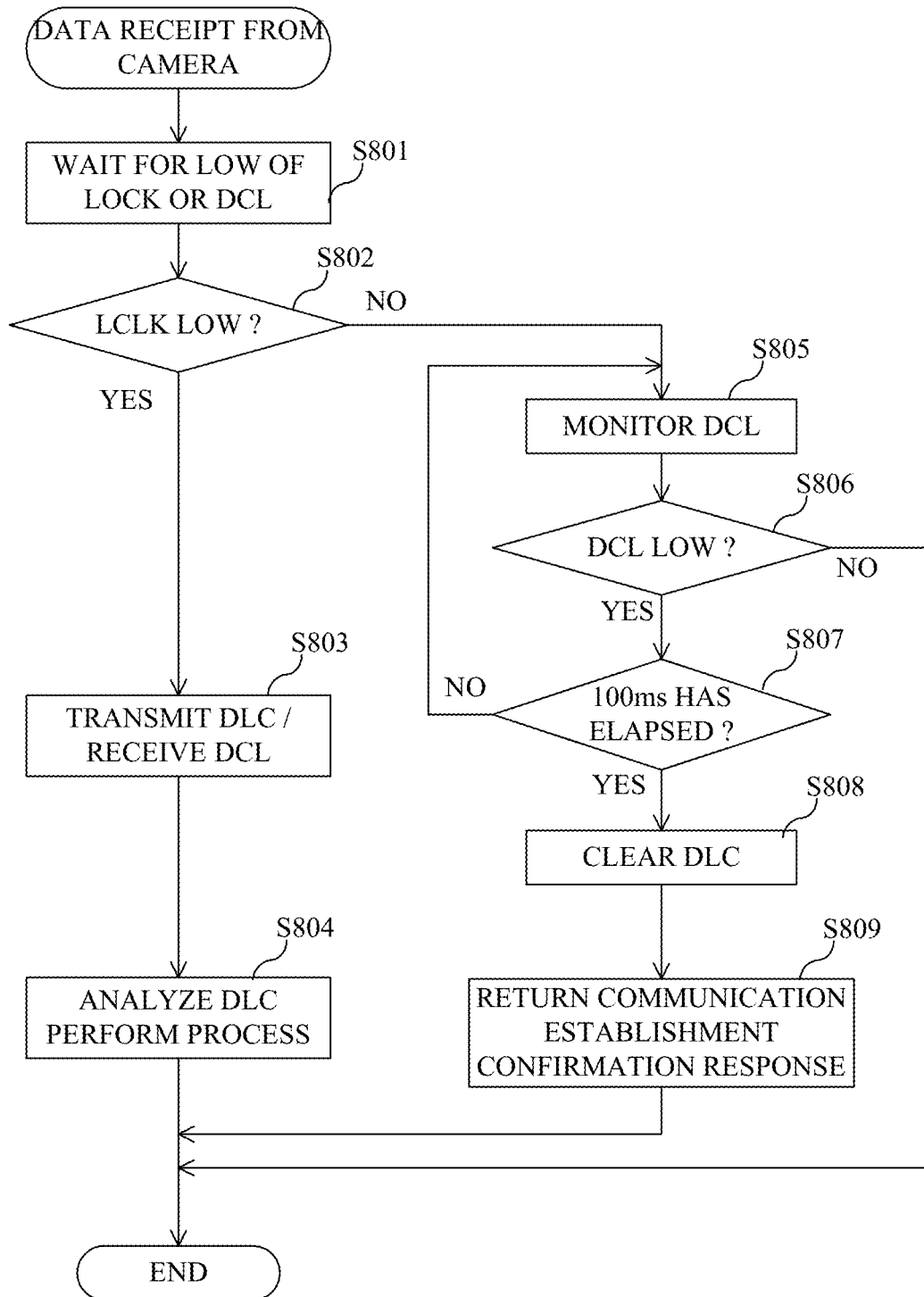
FIG. 8 is a flowchart of a process performed by the interchangeable lens in Embodiment 1.

FIG. 8 is a flowchart of a lens communication control process (control method) including the lens communication restoration process and performed by the lens microcomputer 111 intending to communicate with the camera microcomputer 205 in the clock synchronous communication method. The lens microcomputer 111 executes this process according to the lens communication control program.

In a state where the lens microcomputer 111 is communicable with the camera microcomputer 205 via the lens communication interface circuit 112a, the lens microcomputer 111 at step S801 waits for receiving a communication request from the camera microcomputer 205.

Specifically, the lens microcomputer 111 waits for any one of the signal levels of the clock signal LCLK and the camera data signal DCL to switch to Low. In response to detecting that any one of the signal levels of the clock signal LCLK and the camera data signal DCL has switched to Low, the lens microcomputer 111 reads a current time from the timer 130 to store the current time to the memory 128 as the Low level detection time.

Next at step S802, the lens microcomputer 111 checks which one of the signal levels of the clock signal LCLK and the camera data signal DCL has switched to Low. If the signal level of the clock signal LCLK has switched to Low, the lens microcomputer 111 proceeds to step 803. If the signal level of the camera data signal DCL has switched to Low, the lens microcomputer 111 proceeds to step 805.

At step S803, the lens microcomputer 111 receives the camera data signal DCL from the camera microcomputer 205, and transmits the lens data signal DLC thereto in the clock synchronous communication method.

Next at step S804, the lens microcomputer 111 analyzes the camera data signal DCL received at step S803, and performs a process corresponding to a result of the analysis. Then, the lens microcomputer 111 ends this process.

On the other hand, at step S805, the lens microcomputer 111 acquires the signal level of the camera data signal DCL.

Next at step S806, the lens microcomputer 111 determines whether or not the signal level of the camera data signal DCL is being kept at Low. If the signal level of the camera data signal DCL is being kept at Low, the lens microcomputer 111 proceeds to step S807. If the signal level of the camera data signal DCL has been switched to High, the lens microcomputer 111 ends this process, and waits for a next communication in the clock synchronous communication method.

At step S807, the lens microcomputer 111 acquires a current time from the timer 130, and calculates an elapsed time from the Low level detection time stored in the memory 128. Then, the lens microcomputer 111 determines whether or not the elapsed time has exceeded the predetermined time (100 ms), in other words, whether or not the predetermined time has elapsed from the Low level detection time. If the elapsed time has not yet exceeded the predetermined time, the lens microcomputer 111 returns to step S805. If the elapsed time has exceeded the predetermined time, the lens microcomputer 111 proceeds to step S808.

At step S808, the lens microcomputer 111 recognizes, by determining that the predetermined time has elapsed from the Low level detection time, receipt of the communication restoration request from the camera microcomputer 205. In response thereto, the lens microcomputer 111 clears (discards) the entire lens data signal DLC buffered in the lens communication interface circuit 112a, that is, initializes the communication in the clock synchronous communication method.

Then, at step S809, the lens microcomputer 111 waits for receiving the communication establishment confirmation request in the clock synchronous communication method from the camera microcomputer 205. In response to receiving the communication establishment confirmation request, the lens microcomputer 111 returns the communication establishment confirmation response to the camera microcomputer 205.

Thereafter, the lens microcomputer 111 receives, from the camera microcomputer 205 having determined that the interchangeable lens 100 is compatible with the asynchronous communication method, the communication method switching request to the asynchronous communication method. In response thereto, the lens microcomputer 111 transmits the communication method switching response to the camera microcomputer 205. The camera microcomputer 205, in response to receiving the communication method switching response, switches its communication method to the asynchronous communication method. Then, the lens microcomputer 111 ends this process.

This embodiment described the case where the camera microcomputer 205 at step S707 sets the signal level of the camera data signal DCL to Low only for the predetermined time of 100 ms. However, the predetermined time of 100 ms is merely an example, and other predetermined times than 100 ms may be employed. The employed predetermined time may be set to the camera and lens microcomputers 205 and 111 by an initial communication therebetween in the clock synchronous communication method when the interchangeable lens 100 is connected (attached) to the camera body 200.

Furthermore, this embodiment described the case where the camera microcomputer 205 and the lens microcomputer 111 restore the communication in the clock synchronous communication method respectively at step S708 and at step S808. However, the communication may be restored in the asynchronous communication method.

As described above, in this embodiment, the camera microcomputer 205, which determines in the communication in the asynchronous communication method that the difference in communication method (that is, the communication error) between the camera and lens microcomputers 205 and 111 has occurred, transmits the communication restoration request to the lens microcomputer 111 by switching the signal level of the camera data signal DCL to Low. On the other hand, the lens microcomputer 111 recognizes the receipt of the communication restoration request by detecting the Low signal level of the camera data signal DCL at a time when the Low signal level of the clock signal LCLK is to be originally detected. Furthermore, in response thereto, the lens microcomputer 111 clears the lens data signal DLC buffered in the lens communication interface circuit 112a. These camera and lens communication restoration processes enable restoring the communication between the camera and lens microcomputers 205 and 111 in the clock synchronous communication method. As a result, the communication error occurring between the camera and lens microcomputers 205 and 111 can be promptly corrected.

Next, description will be made of camera and lens communication restoration processes performed when the camera microcomputer 205 intends to communicate with the lens microcomputer 111 in the clock synchronous communication method and, on the other hand, the lens microcomputer 111 intends to communicate with the camera microcomputer 205 in the asynchronous communication method.

Figure 9:
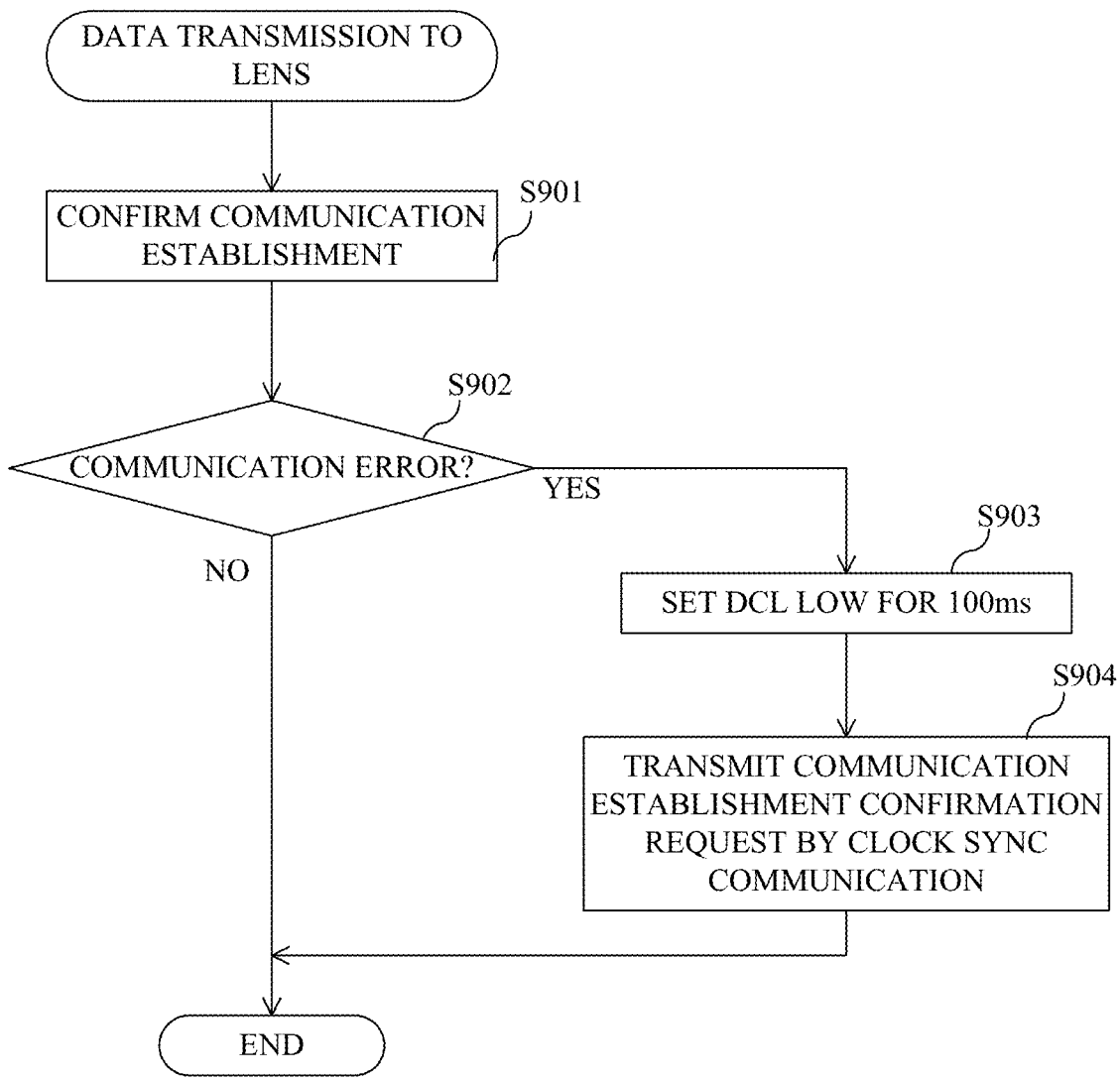
FIG. 9 is a flowchart of anther process performed by the camera body in Embodiment 1.

FIG. 9 is a flowchart of a camera communication control process (control method) including the camera communication restoration process and performed by the camera microcomputer 205 intending to communicate with the lens microcomputer 111 in the clock synchronous communication method.

At step S901, in response to an event for periodically checking a communication state with the lens microcomputer 111, the camera microcomputer 205 transmits the communication establishment confirmation request to the lens microcomputer 111 in the clock synchronous communication method. The camera microcomputer 205 then receives the communication establishment confirmation response from the lens microcomputer 111 by the full-duplex communication.

Next at step S902, the camera microcomputer 205 determines whether or not the communication establishment confirmation response received at step S901 indicates a communication establishment confirmation in the clock synchronous communication method, in other words, the communication methods of the camera and lens microcomputers 205 and 111 coincide with each other, in further other words, whether or not the communication error has occurred. If the communication methods coincide with each other (that is, the communication error has not occurred), the camera microcomputer 205 ends this process. If the communication methods do not coincide with each other (that is, the communication error has occurred), the camera microcomputer 205 proceeds to step S903.

At step S903, the camera microcomputer 205 switches, while keeping the signal level of the clock signal LCLK at High, the signal level of the camera data signal DCL to Low and keeps the Low signal level for the predetermined time (100 ms). Keeping the signal level of the camera data signal DCL at Low for the predetermined time while keeping the signal level of the clock signal LCLK at High corresponds to transmitting, from the camera microcomputer 205 to the lens microcomputer 111, the communication restoration request as the specific signal for restoring (or requesting to restore) the communication.

After the predetermined time (100 ms) has elapsed, the camera microcomputer 205 at step S904 returns the signal level of the camera data signal DCL to High.

Furthermore, the camera microcomputer 205 transmits the communication establishment confirmation request to the lens microcomputer 111 in the clock synchronous communication method to determine that the communication has been restored by receiving the communication establishment confirmation response indicating the communication establishment confirmation in the clock synchronous communication method. Then, the camera microcomputer 205 ends this process.

Figure 10:
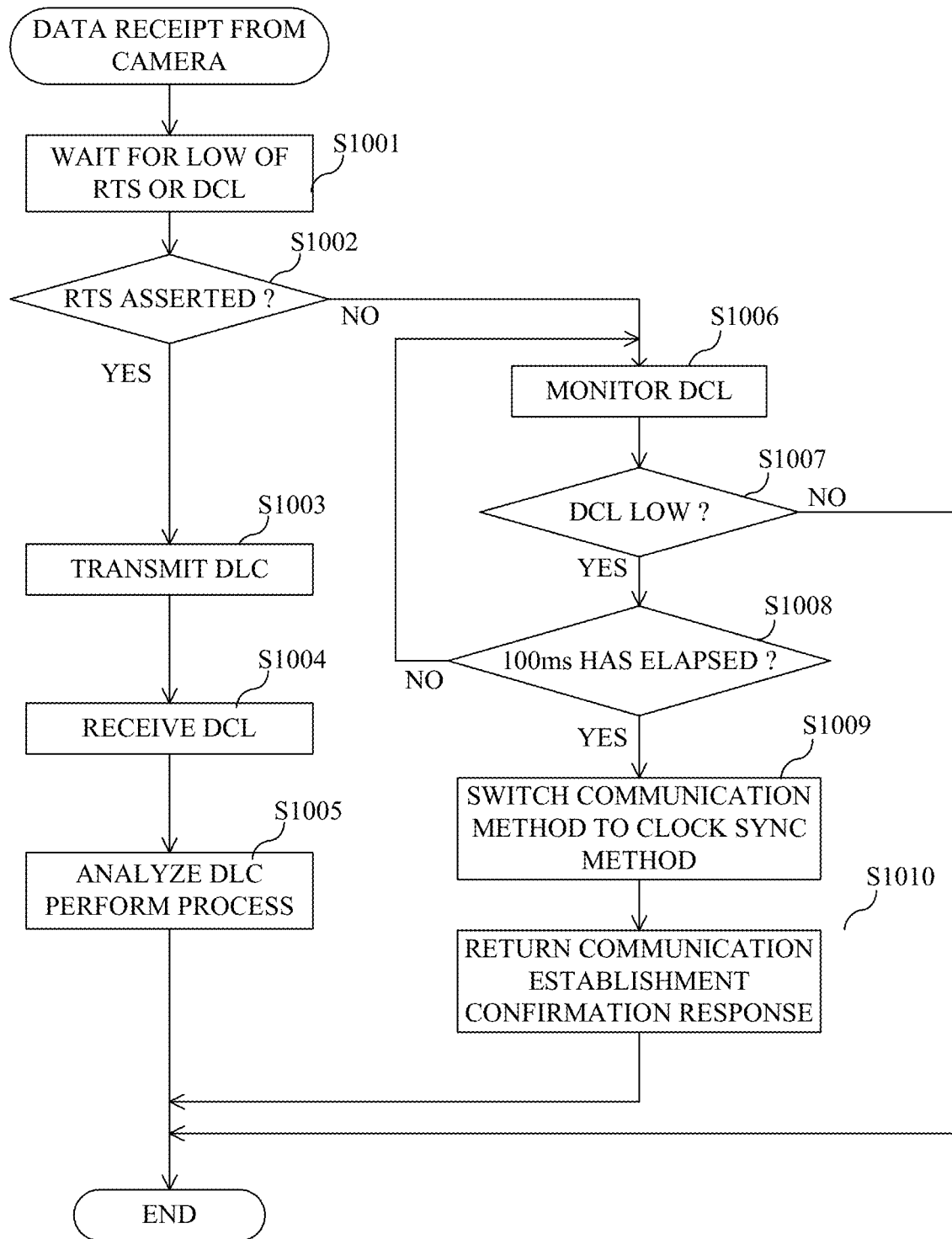
FIG. 10 is a flowchart of another process performed by the interchangeable lens in Embodiment 1.

FIG. 10 is a flowchart of a lens communication control process (control method) including the lens communication restoration process and performed by the lens microcomputer 111 intending to communicate with the camera microcomputer 205 in the asynchronous communication method. In a state where the lens microcomputer 111 is communicable with the camera microcomputer 205 via the lens communication interface circuit 112a, the lens microcomputer 111 starts the process from step S1001.

At step S1001, the lens microcomputer 111 waits for any one of the signal levels of the request-to-send signal RTS and the camera data signal DCL to switch to Low. In response to detecting that any one of the signal levels of the request-to-send signal RTS and the camera data signal DCL has switched to Low, the lens microcomputer 111 reads a current time from the timer 130 to store the current time to the memory 128 as the Low level detection time.

Next at step S1002, the lens microcomputer 111 checks whether or not the request-to-send signal RTS is asserted. If the request-to-send signal RTS is asserted, the lens microcomputer 111 proceeds to step S1003. If the request-to-send signal RTS is not asserted, the lens microcomputer 111 proceeds to step S1006.

At step S1003, the lens microcomputer 111 transmits the lens data signal DLC to the camera microcomputer 205 in the asynchronous communication method.

At step S1004, the lens microcomputer 111 receives the camera data signal DCL from the camera microcomputer 205 in the asynchronous communication method.

Next at step S1005, the lens microcomputer 111 analyzes the camera data signal DCL received at step S1004, and performs a process corresponding to a result of the analysis. Then, the lens microcomputer 111 ends this process.

On the other hand, at step S1006, the lens microcomputer 111 acquires the signal level of the camera data signal DCL.

Next at step S1007, the lens microcomputer 111 determines whether or not the signal level of the camera data signal DCL is being kept at Low. If the signal level of the camera data signal DCL is being kept at Low, the lens microcomputer 111 proceeds to step S1008. If the signal level of the camera data signal DCL has been switched to High, the lens microcomputer 111 ends this process, and waits for a next communication in the asynchronous communication method.

At step S1008, the lens microcomputer 111 acquires a current time from the timer 130, and calculates an elapsed time from the Low level detection time stored in the memory 128. Then, the lens microcomputer 111 determines whether or not the elapsed time has exceeded the predetermined time (100 ms), in other words, whether or not the predetermined time has elapsed from the Low level detection time. If the elapsed time has not yet exceeded the predetermined time, the lens microcomputer 111 returns to step S1006. If the elapsed time has exceeded the predetermined time, the lens microcomputer 111 proceeds to step S1009.

At step S1009, the lens microcomputer 111 recognizes, by determining that the predetermined time has elapsed from the Low level detection time, receipt of the communication restoration request from the camera microcomputer 205. In response thereto, the lens microcomputer 111 switches its communication method to the clock synchronous communication method.

Next at step S1010, the lens microcomputer 111 waits for receiving the communication establishment confirmation request in the clock synchronous communication method from the camera microcomputer 205. In response to receiving the communication establishment confirmation request, the lens microcomputer 111 returns the communication establishment confirmation response to the camera microcomputer 205. Then, the lens microcomputer 111 ends this process.

As described above, in this embodiment, the camera microcomputer 205 at step S901 determines in the communication in the clock synchronous communication method whether the difference in communication method (that is, the communication error) between the camera and lens microcomputers 205 and 111 has occurred, by using the communication establishment confirmation request and response. However, the camera microcomputer 205 may detect the difference in communication method by not detecting the BUSY frame that is to be included in the communication.

Furthermore, this embodiment described the case where the camera microcomputer 205 and the lens microcomputer 111 restore the communication in the clock synchronous communication method respectively at step S904 and at step S1009. However, the communication may be restored in the asynchronous communication method.

As described above, in this embodiment, the camera microcomputer 205, which determines in the communication in the clock synchronous communication method that the difference in communication method (that is, the communication error) between the camera and lens microcomputers 205 and 111 has occurred, transmits the communication restoration request to the lens microcomputer 111 by switching the signal level of the camera data signal DCL to Low. On the other hand, the lens microcomputer 111 recognizes the receipt of the communication restoration request by detecting the Low signal level of the camera data signal DCL at a time when the Low signal level of the request-to-send signal RTS is to be originally detected. Then, the lens microcomputer 111 switches its communication method to the clock synchronous communication method. These camera and lens communication restoration processes enable restoring the communication between the camera and lens microcomputers 205 and 111 in the clock synchronous communication method. As a result, the communication error occurring between the camera and lens microcomputers 205 and 111 can be promptly corrected.

Moreover, in this embodiment, when the communication error occurs in the communication in any of the asynchronous and clock synchronous communication methods, the camera microcomputer 205 keeps the signal level of the camera data signal DCL at Low while keeping the signal level of the clock/transmission request channel at High, and thereby transmits the communication restoration request to the lens microcomputer 111. That is, each of the camera and lens microcomputers 205 and 111 can restore the communication by the same communication restoration process in the communication in the asynchronous and clock synchronous communication methods.

In the above embodiment, the camera microcomputer 205 transmits, in any of the asynchronous and clock synchronous communication methods, the communication restoration request to the lens microcomputer 111 by keeping the signal level of the camera data signal DCL at Low for the predetermined time. However, the camera microcomputer 205 may transmit the communication restoration request by transmitting a specific signal having a specific signal waveform as the camera data signal DCL.

Although the above embodiment described the case of using the interchangeable lens as an example of accessory apparatuses, other accessory apparatuses such as an illumination (flash) apparatus may be used.

The above embodiment enables, in the camera system including the image-capturing apparatus and the accessory apparatus each capable of switching their communication method between the first and second communication methods, promptly restoring their communication when the communication error occurs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-145163, filed on Jul. 25, 2016, which is hereby incorporated by reference herein in its entirety.

What is claimed is:

1. An image-capturing apparatus to which an accessory apparatus is attachable, the image-capturing apparatus comprising:
a first communication channel, a second communication channel, and a third communication channel, each of these channels used for communicating with the accessory apparatus;
one or more processors; and
a memory storing instructions which, when executed by the one or more processors, cause the image-capturing apparatus to function as: a camera control unit configured to communicate with the accessory apparatus by a first communication method in which the camera control unit transmits camera data via the first communication channel in correspondence with transmission of a clock signal via the second communication channel, or by a second communication method in which the camera control unit transmits camera data in correspondence with reception, via the third communication channel, of accessory data, the accessory data having been received at a corresponding timing with respect to a change of signal level of the second communication channel from a first level to a second level, wherein, when a signal level of the first communication channel is kept at a predetermined level for a predetermined time while a signal level of the second communication channel is kept at the first level, the camera control unit changes, after elapse of the predetermined time, a signal level of the first communication channel from the predetermined level to a signal level different from the predetermined level, and transmits first camera data via the second communication channel in the first communication method.

2. An image-capturing apparatus according to claim 1, wherein the camera control unit controls a transition of communication mode from the second communication method to the first communication method after elapse of the predetermined time.

3. An image-capturing apparatus according to claim 1, wherein the first camera data corresponds to a request for communication by the first communication method.

4. An image-capturing apparatus according to claim 1, wherein the camera control unit, in response to detecting a communication error in a communication in the second communication method, keeps a signal level of the first communication channel at a predetermined level for a predetermined time while keeping a signal level of the second communication channel at the first level.

5. An image-capturing apparatus according to claim 4, wherein the camera control unit detects, in the second communication method, the communication error based on at least one of parity information or a stop bit included in the accessory data received via the third communication channel.

6. An accessory apparatus attachable to an image-capturing apparatus, the accessory apparatus comprising:
a first communication channel, a second communication channel, and a third communication channel, each of these channels used for communicating with the image-capturing apparatus;
one or more processors; and
a memory storing instructions which, when executed by the one or more processors, cause the image-capturing apparatus to function as: an accessory control unit configured to communicate with the image-capturing apparatus by a first communication method in which the accessory control unit transmits accessory data via the third communication channel in correspondence with reception of a clock signal via the second communication channel, or by a second communication method in which the accessory control unit transmits accessory data in correspondence with change of signal level of the second communication channel from a first level to a second level, wherein, when a signal level of the first communication channel is kept at a predetermined level for a predetermined time while a signal level of the second communication channel is kept at the first level, the accessory control unit transmits, after elapse of the predetermined time, in correspondence with change of signal level of the second communication channel from the first level to the second level, first accessory data via the third communication channel.

7. An accessory apparatus according to claim 6, wherein the accessory control unit performs a reset operation of the communication by clearing the accessory data buffered for transmission to the image-capturing apparatus via the third communication channel, before reception of camera data via the first communication channel.

8. An accessory apparatus according to claim 6, wherein the accessory control unit transmits, in response to reception of request via the first communication channel after elapse of the predetermined time and change of a signal level of the second communication channel from the first level to the second level, a response corresponding to confirmation of communication by the first communication method.

9. An accessory apparatus according to claim 6, wherein the accessory control unit transmits, in the second communication method, the accessory data including at least one of parity information or a stop bit via the third communication channel.

10. An image-capturing system including an image-capturing apparatus and an accessory apparatus detachably attachable to the image-capturing apparatus, the system comprising:
a first communication channel, a second communication channel, and a third communication channel, each of these channels used for communicating with the accessory apparatus;
one or more processors; and
a memory storing instructions which, when executed by the one or more processors, cause the image-capturing apparatus to function as:
(1) a camera control unit configured to communicate with the accessory apparatus by a first communication method in which the camera control unit transmits camera data via the first communication channel in correspondence with transmission of a clock signal via the second communication channel, or by a second communication method in which the camera control unit transmits camera data in correspondence with reception, via the third communication channel, of accessory data, the accessory data having been received at a corresponding timing with respect to a change of signal level of the second communication channel from a first level to a second level; and
(2) an accessory control unit configured to communicate with the image-capturing apparatus by a first communication method in which the accessory control unit transmits accessory data via the third communication channel in correspondence with reception of a clock signal via the second communication channel, or by a second communication method in which the accessory control unit transmits accessory data in correspondence with change of signal level of the second communication channel from a first level to a second level,
wherein when a signal level of the first communication channel is kept at a predetermined level for a predetermined time while a signal level of the second communication channel is kept at the first level, the camera control unit changes, after elapse of the predetermined time, a signal level of the first communication channel from the predetermined level to a signal level different from the predetermined level, and transmits first camera data via the second communication channel in the first communication method, and wherein when a signal level of the first communication channel is kept at a predetermined level for a predetermined time while a signal level of the second communication channel is kept at the first level, the accessory control unit transmits, after elapse of the predetermined time, in correspondence with change of signal level of the second communication channel from the first level to the second level, first accessory data via the third communication channel.

11. A control method of an image-capturing apparatus to which an accessory apparatus is attachable, the image-capturing apparatus including a first communication channel, a second communication channel, and a third communication channel, each of these channels used for communicating with the accessory apparatus, the control method comprising the steps of:

causing the image-capturing apparatus to communicate with the accessory apparatus by a first communication method in which the image-capturing apparatus transmits camera data via the first communication channel in correspondence with transmission of a clock signal via the second communication channel, or by a second communication method in which the image-capturing apparatus transmits camera data in correspondence with reception, via the third communication channel, of accessory data, the accessory data having been received at a corresponding timing with respect to a change of signal level of the second communication channel from a first level to a second level; and causing the image-capturing apparatus to, when a signal level of the first communication channel is kept at a predetermined level for a predetermined time while a signal level of the second communication channel is kept at the first level, change, after elapse of the predetermined time, a signal level of the first communication channel from the predetermined level to a signal level different from the predetermined level, and transmit first camera data via the second communication channel in the first communication method.

12. A control method of an accessory apparatus attachable to an image-capturing apparatus, the accessory apparatus including a first communication channel, a second communication channel, and a third communication channel, each of these channels used for communicating with the image-capturing apparatus, the control method comprising the steps of:

causing the accessory apparatus to communicate with the image-capturing apparatus by a first communication method in which the accessory apparatus transmits accessory data via the third communication channel in correspondence with reception of a clock signal via the second communication channel, or by a second communication method in which the accessory apparatus transmits accessory data in correspondence with change of signal level of the second communication channel from a first level to a second level; and causing the accessory apparatus, when a signal level of the first communication channel is kept at a predetermined level for a predetermined time while a signal level of the second communication channel is kept at the first level, to transmit, after elapse of the predetermined time, in correspondence with change of a signal level of the second communication channel from the first level to the second level, first accessory data via the third communication channel.

13. An image capturing apparatus according to claim 1, wherein in the first communication method, the camera control unit transmits camera data via the first communication channel and receives accessory data via the third communication channel in correspondence with transmission of a clock signal via the second communication channel.

14. An image capturing apparatus according to claim 1, wherein in the second communication method in which the camera control unit transmits camera data via the first communication channel in correspondence with reception of accessory data via the third communication channel, the accessory data is received at a corresponding timing with a change of signal level of the second communication channel from a first level to a second level.

15. An image capturing apparatus according to claim 1, wherein the clock signal is a signal where change of a signal level of the second communication channel from the first level back to the first level via the second level is repeated 8 times.

16. An image capturing apparatus according to claim 15, wherein the predetermined time is longer than a time when a change of a signal level of the second communication channel from the first level back to the first level via the second level is repeated 8 times.

17. An accessory apparatus according to claim 6, wherein in the first communication method the accessory control unit transmits accessory data via the third communication channel and receives camera data via the first communication channel in correspondence with reception of a clock signal via the second communication channel.

18. An accessory apparatus according to claim 6, wherein in the second communication method the accessory control unit transmits accessory data via the third communication channel in correspondence with change of signal level of the first communication channel from a first level to a second level and receives camera data via the first communication channel in correspondence with transmission of the accessory data via the third communication channel.

19. An accessory apparatus according to claim 6, wherein the clock signal is a signal where a change of a signal level of the second communication channel from the first level back to the first level via the second level is repeated 8 times.

20. An accessory apparatus according to claim 19, wherein the predetermined time is longer than a time when a change of a signal level of the second communication channel from the first level back to the first level via the second level is repeated 8 times.

* * * * *